US008782651B2

(12) United States Patent
Bhattiprolu et al.

(10) Patent No.: US 8,782,651 B2
(45) Date of Patent: *Jul. 15, 2014

(54) DYNAMICALLY REDIRECTING A FILE DESCRIPTOR OF AN EXECUTING PROCESS BY ANOTHER PROCESS BY OPTIONALLY SUSPENDING THE EXECUTING PROCESS

(75) Inventors: Sukadev Bhattiprolu, Beaverton, OR (US); Matthew Lee Helsley, Beaverton, OR (US)

(73) Assignee: International Business Machines Corporation, Armonk, NY (US)

( * ) Notice: Subject to any disclaimer, the term of this patent is extended or adjusted under 35 U.S.C. 154(b) by 346 days.

This patent is subject to a terminal disclaimer.

(21) Appl. No.: 13/245,507

(22) Filed: Sep. 26, 2011

(65) Prior Publication Data

US 2013/0081017 A1   Mar. 28, 2013

(51) Int. Cl.
*G06F 9/46* (2006.01)
*G06F 13/00* (2006.01)
*G06F 3/00* (2006.01)

(52) U.S. Cl.
USPC .......... 718/102; 718/100; 718/108; 711/154; 711/167; 710/36; 710/38

(58) Field of Classification Search
None
See application file for complete search history.

(56) References Cited

U.S. PATENT DOCUMENTS

| 6,732,211 | B1 | 5/2004 | Goyal et al. |
| 6,766,471 | B2 | 7/2004 | Meth |
| 6,877,160 | B2 | 4/2005 | Delatorre et al. |
| 7,363,288 | B2 | 4/2008 | Santos et al. |
| 7,685,172 | B2 | 3/2010 | Craft et al. |
| 7,844,974 | B2 | 11/2010 | Kalmuk et al. |
| 2006/0294039 | A1 | 12/2006 | Mekenkamp et al. |
| 2008/0294703 | A1 | 11/2008 | Craft et al. |
| 2008/0295114 | A1 | 11/2008 | Argade et al. |
| 2008/0307265 | A1 | 12/2008 | Vertes |
| 2010/0241895 | A1 | 9/2010 | Li et al. |

OTHER PUBLICATIONS

W. Richard Stevens; Advanced Programming in the UNIX® Environment: UNIX File I/O; Aug. 1, 2003.*
Maeda, Chris; "A Metaobject Protocol for Accessing File Systems", ISOTAS Carnegie Mellon University, School of Computer Science, Jul. 24, 1995, Springer-Verlag, Berlin 1996.
Goglin, et al.; "Transparent Remote File Access Through a Shared Library Client", Centre National De La Recherche Scientifique, Dec. 2003.
Jacobsen, et al.: "Changing a Process' File Descriptor on the Fly," on the Third Side, ingvar.blog.linpro.no/2010/07/10/changing-a-process-file-descriptor-on-the-fly/, Jul. 10, 2010.
U.S. Appl. No. 13/482,752, Notice of Allowance, Nov. 26, 2013.

* cited by examiner

*Primary Examiner* — Abdullah Al Kawsar
*Assistant Examiner* — Bing Zhoa
(74) *Attorney, Agent, or Firm* — Kunzler Law Group

(57) ABSTRACT

The method includes identifying a first executing process using a second executing process. The first executing process may include a file descriptor and the first executing process may be independent of the second executing process. The method includes disassociating the file descriptor from a first data stream using the second executing process without involvement of the first executing process. The method includes associating the file descriptor with a second data stream using the second executing process without involvement of the first executing process in response to disassociating the file descriptor from the first data stream.

17 Claims, 10 Drawing Sheets

DYNAMICALLY REDIRECTING A FILE DESCRIPTOR OF AN EXECUTING PROCESS BY ANOTHER PROCESS BY OPTIONALLY SUSPENDING THE EXECUTING PROCESS

STATEMENT REGARDING FEDERALLY SPONSORED RESEARCH

This invention was made with Government support under HR0011-07-9-0002 awarded by Defense Advanced Research Projects Agency ("DARPA"). The Government has certain rights to this invention.

FIELD

The subject matter disclosed herein relates to file descriptors and more particularly relates to dynamically redirecting a file descriptor.

BACKGROUND

Description of the Related Art

Processes typically use file descriptors to access data streams such as files, pipes, sockets, and the like. A process may write to or read from a data stream using a file descriptor referencing that data stream. The association between the file descriptor and the data stream is often persistent across the lifetime of the process. A process may also often have one or more aliases ("dups") of a data stream.

Once a process is executing, an administrator typically has no control over the file descriptors, including the dups, of the process. Specifically, the administrator often has no way of directing the data written to one of the dups to go to a different file without shutting down the process and restarting it with the desired file descriptor pointing to a different data stream and, as a result, losing any state data that the process has acquired, especially if the process has been executing for a long period of time.

BRIEF SUMMARY

A method for dynamically redirecting a file descriptor is presented. In one embodiment, the method includes identifying a first executing process using a second executing process. The first executing process includes a file descriptor and the first executing process is typically independent of the second executing process. In another embodiment, the method includes disassociating the file descriptor from a first data stream using the second executing process without involvement of the first executing process. In another embodiment, the method includes associating the file descriptor with a second data stream using the second executing process without involvement of the first executing process in response to disassociating the file descriptor from the first data stream.

An apparatus for dynamically redirecting a file descriptor is provided with a plurality of modules configured to functionally execute the steps described above with regard to the presented method. These modules, in the described embodiments, include an identification module, an disassociation module, and an association module.

In one embodiment, the identification module identifies a first executing process in response to a second executing process. The first executing process includes a first file descriptor. The first executing process is typically independent of the second executing process. In another embodiment, the disassociation module disassociates the file descriptor from a first data stream in response to the second executing process without involvement of the first executing process. In another embodiment, the association module associates the file descriptor with a second data stream in response to the second executing process without involvement of the first executing process in response to the disassociation module disassociating the first executing process from the first file descriptor.

A system for dynamically redirecting a file descriptor is also presented. The system may be embodied by an operating system, a processor, and a memory storing modules for execution by the processor. The modules include an identification module, an disassociation module, and an association module. In one embodiment, the identification module identifies a first executing process using a second executing process. The first executing process includes a first file descriptor. The first executing process is typically independent of the second executing process. In another embodiment, the disassociation module disassociates the file descriptor from a first data stream using the second executing process without involvement of the first executing process. In another embodiment, the association module associates the file descriptor with a second data stream using the second executing process without involvement of the first executing process in response to the disassociation module disassociating the first executing process from the first file descriptor.

A computer program product comprising a computer readable storage medium having computer readable program code for dynamically redirecting a file descriptor is also presented. In one embodiment, the computer program product includes identifying a first executing process using a second executing process. The first executing process includes a file descriptor and the first executing process is independent of the second executing process. In another embodiment, the computer program product includes disassociating the file descriptor from a first data stream using the second executing process without involvement of the first executing process. In yet another embodiment, the computer program product includes associating the file descriptor with a second data stream using the second executing process without involvement of the first executing process in response to disassociating the file descriptor from the first data stream.

Another method is presented. The method in the disclosed embodiments includes integrating a file descriptor redirection apparatus with an operating system. The file descriptor redirection apparatus module, in certain embodiments, is capable of performing the steps of the method described above.

References throughout this specification to features, advantages, or similar language do not imply that all of the features and advantages may be realized in any single embodiment. Rather, language referring to the features and advantages is understood to mean that a specific feature, advantage, or characteristic is included in at least one embodiment. Thus, discussion of the features and advantages, and similar language, throughout this specification may, but do not necessarily, refer to the same embodiment.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1A:
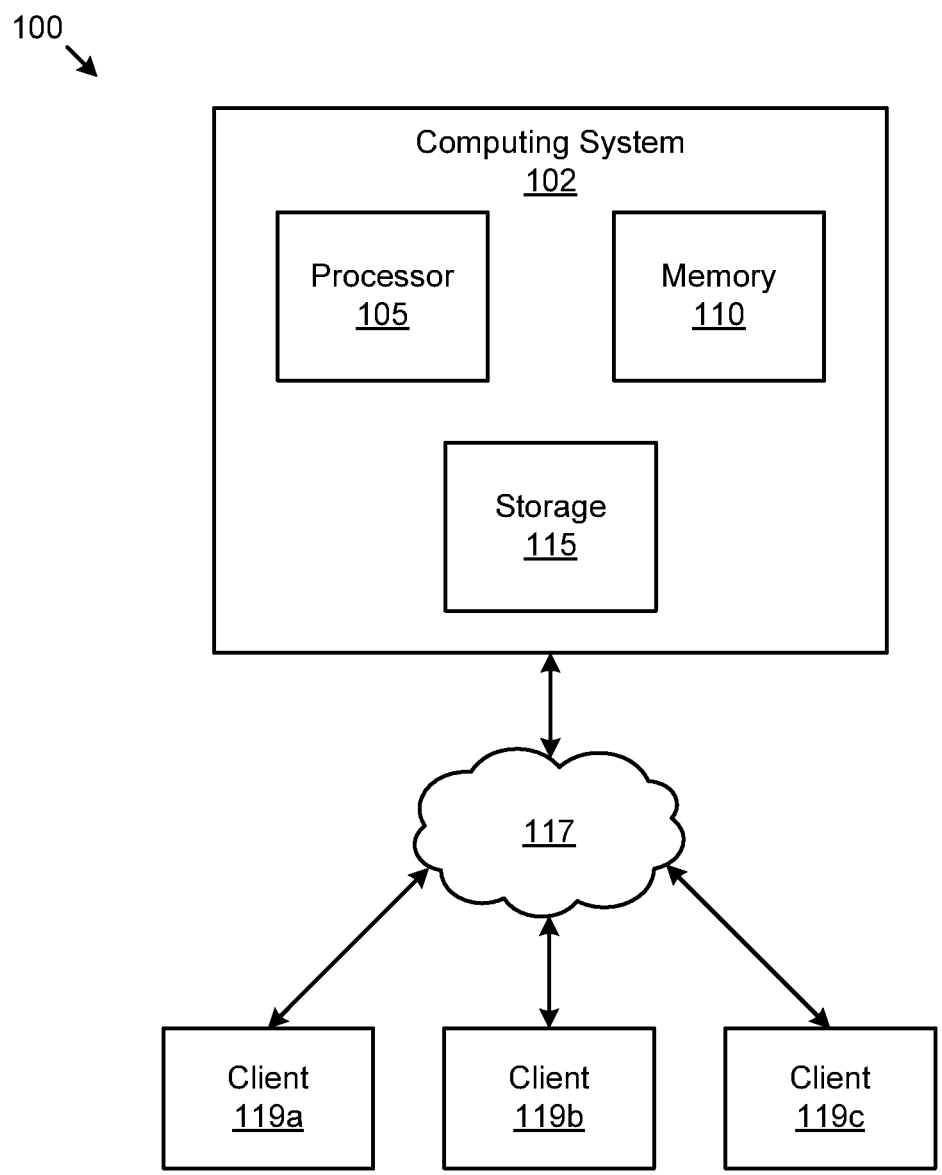
FIG. 1A is a schematic block diagram illustrating one embodiment of a system for dynamically redirecting a file descriptor in accordance with the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of computer readable program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of computer readable program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the computer readable program code may be stored and/or propagated on in one or more computer readable medium(s).

The computer readable medium may be a tangible computer readable storage medium storing the computer readable program code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer readable medium may include but are not limited to a portable computer diskette, a hard disk, a random access memory ("RAM"), a read-only memory ("ROM"), an erasable programmable read-only memory ("EPROM" or "Flash memory"), a portable compact disc read-only memory ("CD-ROM"), a digital versatile disc ("DVD"), an optical storage device, a magnetic storage device, a holographic storage medium, a micromechanical storage device, or any suitable combination of the foregoing. In the context of this document, a computer readable storage medium may be any tangible medium that can contain, and/or store computer readable program code for use by and/or in connection with an instruction execution system, apparatus, or device.

The computer readable medium may also be a computer readable signal medium. A computer readable signal medium may include a propagated data signal with computer readable program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport computer readable program code for use by or in connection with an instruction execution system, apparatus, or device. Computer readable program code embodied on a computer readable signal medium may be transmitted using any appropriate medium, including but not limited to wireless, wireline, optical fiber cable, Radio Frequency ("RF"), or the like, or any suitable combination of the foregoing.

In one embodiment, the computer readable medium may comprise a combination of one or more computer readable storage mediums and one or more computer readable signal mediums. For example, computer readable program code may be both propagated as an electro-magnetic signal through a fiber optic cable for execution by a processor and stored on RAM storage device for execution by the processor.

Computer readable program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The computer readable program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and computer program products according to embodiments of the invention. It will be understood that each block of the schematic flowchart diagrams and/or schematic block diagrams, and combinations of blocks in the schematic flowchart diagrams and/or schematic block diagrams, can be implemented by computer readable program code. These computer readable program code may be provided to a processor of a general purpose computer, special purpose computer, sequencer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The computer readable program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

The computer readable program code may also be loaded onto a computer, other programmable data processing apparatus, or other devices to cause a series of operational steps to be performed on the computer, other programmable apparatus or other devices to produce a computer implemented process such that the program code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and computer readable program code.

FIG. 1A depicts one embodiment of a system 100 for dynamically redirecting a file descriptor in accordance with the present invention. In the depicted embodiment, system 100 includes a computing system 102 with a processor 105, a memory 110, and storage 115. The computing system 102 is in communication with one or more clients 119*a*, 119*b*, 119*c*, through a network 117.

The memory 110 stores computer readable programs. The memory may be embodied by volatile memory such as dynamic random access memory ("DRAM"), static random access memory ("SRAM"), or other suitable volatile memory. The processor 105 executes the computer readable programs as is well known to those skilled in the art. The computer readable programs may be tangibly stored in storage 115. The storage 115 may include a Solid State Drive ("SSD"), a hard disk drive ("HDD"), an optical storage device, a holographic storage device, a micromechanical storage device, or other non-volatile data storage device. The computing system 102 may be embodied by a server computer, a desktop computer, a laptop computer, a tablet computer, a mobile device, a set top box, or another device that includes a processor and a memory. The computer readable programs may include an operating system to execute on the computing system 102 and to manage software and hardware resources of the computing system 102. The operating system may comprise a Linux operating system, a Unix operating system, an operating system according to Portable Operating System Interface for Unix ("POSIX"), or any other suitable operating system.

The network 117 may comprise a communications network such as the Internet, a Local Area Network ("LAN"), a Wireless LAN ("WLAN"), multiple LANs communicating over the Internet, or any other similar communications network. Each client 119a, 119b, 119c may communicate with the computing system 102 through the network 117. In one embodiment, a client 119a may be embodied as a desktop computer, a portable computer, a server, a mainframe computer, a handheld computing device, a touch device, a PDA, a tablet computer, an e-Book reader, a mobile phone, a Smartphone, and the like. In one embodiment, the client 210a may also include and/or is embodied as a software application.

Figure 1B:
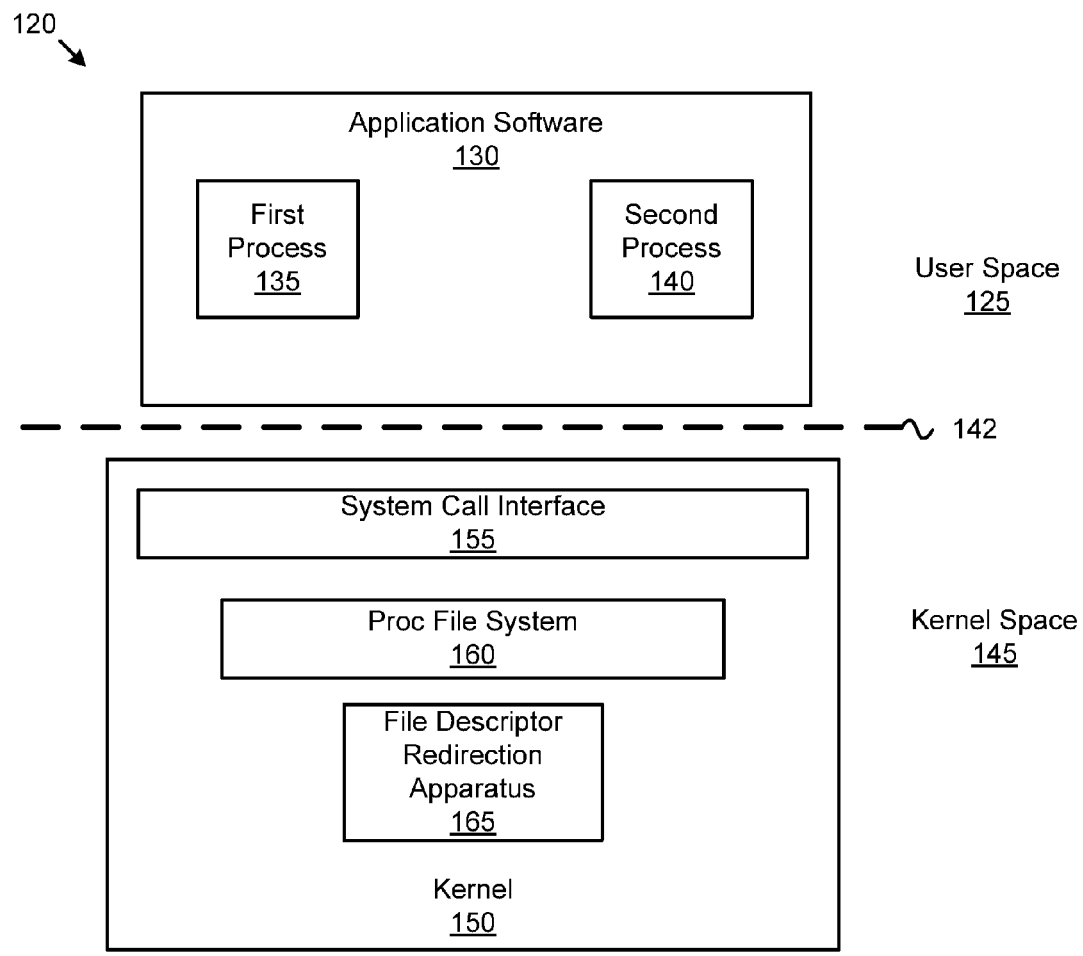
FIG. 1B is a schematic block diagram illustrating one embodiment of a system for dynamically redirecting a file descriptor in accordance with the present invention.

FIG. 1B depicts one embodiment of a system 120 for dynamically redirecting a file descriptor. Specifically, FIG. 1B depicts software layers that may execute on the computing system 102 of FIG. 1A and may comprise at least a portion of the operating system of the computing system 102. FIG. 1B includes application software 130 executing in user space 125 of the computing system 102. User space 125 is segregated 142 from kernel space 145. FIG. 1B also includes an operating system kernel 150 executing in kernel space 145.

The application software 130 includes applications, utilities, and/or processes that operate in user space 125. As is known in the art, software code in the user space 125 is typically non-kernel code in which applications and utilities operate with controlled access to computer system resources. Processes running in user space 125 typically cannot access the virtual memory of other processes directly. A process is a run-time instance of a computer readable program, executing on the operating system of the computing system 102. Each process may include its own resources, such as executable computer code, virtual memory, and operating system resources described below. The application software 130 includes a first process 135 and a second process 140. The first process 135 and the second process 140 may be currently executing and may be independent of one another (e.g. the second process 140 is not a child or parent of the first process 135). In one embodiment, the first process 135 and/or the second process 140 is a system utility integrated with and/or associated with the operating system. Furthermore, the first process 135 and/or the second process 140 may be associated with a command (e.g. an operating system utility such as an ln command) and/or user space application.

As is known in the art, the kernel 150 is typically the primary component of the operating system 100, providing communication between processes and the hardware of the computing system 102. Software code executing in kernel space 145 has full access to system resources and runs the operating system kernel 150 and certain device drivers. Kernel space memory is typically protected from applications running in user space 125. In the depicted embodiment, the kernel 150 includes a system call interface 155 and a proc file system 160.

In the depicted embodiment, the system call interface 155 provides a library and/or application programming interface ("API") to processes in user space 125 to allow them to request services from the kernel 150 through the use of a system call. The proc file system 160 typically presents information about processes in a file-like structure. As stated above, the kernel 150 provides each process 135, 140 with kernel resources including file descriptors and a file descriptor table—a kernel resident data structure—for each process 135, 140. A file descriptor is an index to an entry in the file descriptor table. The file descriptor specifies one or more data streams associated with a process 135.

Each data stream may be a source for the process 140 to receive input or a destination for the process 135 to direct output. Data streams may include files, directories, sockets, pipes, keyboard input, monitor output, and the like. A particular file descriptor may reference a particular data stream and the file descriptor table translates the index number of the particular file descriptor to the particular data stream (e.g. an open file). In one embodiment, each entry in the file descriptor table has a pointer, or link, to a file object that includes information the kernel uses to access the data stream associated with the file object (open mode, file offset, and the like). In one embodiment, each entry in the file descriptor table has a pointer, or link, to an entry in a system file table that includes entries for available data streams (e.g. open files).

In one embodiment, a file descriptor is an integer. Furthermore, certain operating systems include three standard file descriptors for each process: "0" for standard input ("stdin"), "1" for standard output ("stdout"), and "2" for standard error ("stderr"). For example, the first process 135 may have stdout referencing file "example1" and stderr referencing file "example2."

In conventional operating systems, the association between the file descriptor and the data stream is often persistent across the lifetime of the process 135. Once a process 135 is executing, an administrator typically has no control over the file descriptors of the process 135. Specifically, in conventional operating systems, the administrator often has no way of directing the data for a data stream of a particular file descriptor to go to a different data stream without shutting down the process 135 and restarting it with the desired file descriptor pointing to the different data stream.

Therefore, in one embodiment of the invention described herein, the operating system includes a file descriptor redirection apparatus 165 that dynamically redirects a file descriptor of a first process 135 without involvement of the first process 135 and without shutting down the first process 135. Specifically, the file descriptor redirection apparatus 165 uses, is activated by, acts in behalf of, and/or acts in response to, a second process 140 independent from the first process 135. The file descriptor redirection apparatus 165 may identify the first process 135 and may disassociate a file descriptor of the first process 135 from a first data stream and associate the file descriptor with a second data stream.

In one embodiment, the second process 140 is a conventional user space utility, such as an ln command utility for managing file links, which calls a conventional system call associated with the utility. The file descriptor redirection apparatus 165 may detect that the user intends to redirect a file descriptor by, for example, detecting a predetermined parameter and/or a file descriptor indicator instead of a file indicator passed with the ln command, and redirect the file descriptor in response to detecting the predetermined parameter/file descriptor indicator. By using a conventional user space utility, but performing redirection if the user space utility specifies certain parameters, the file descriptor redirection apparatus 165 may provide users with a familiar interface and reduce modifications to user space 125 code.

In one embodiment, the file descriptor redirection apparatus 165 provides a specialized system call to redirect a file descriptor. In this embodiment, the second process 140 may include a user space utility that makes the system call, passing in identifiers for the desired process 135, the file descriptor to redirect of the desired process 135, and the new data stream to which the file descriptor is to be redirected.

For example, once a first process 135 is executing, the user may encounter a particular error condition and wish to redirect stderr to a separate file. Using the file descriptor redirection apparatus 165, the user may redirect stderr without shutting down the first process 135 and losing valuable state data and possibly losing the ability to replicate the error condition.

In the depicted embodiment, the file descriptor redirection apparatus 165 executes in kernel space 145. The file descriptor redirection apparatus 165 may be in communication with, integrated with, and/or associated with the operating system and/or the operating system kernel 150. In another embodiment, a portion of the file descriptor redirection apparatus 165 may also execute in user space 125 as, for example, a utility (e.g. the second process 140).

Figure 2:
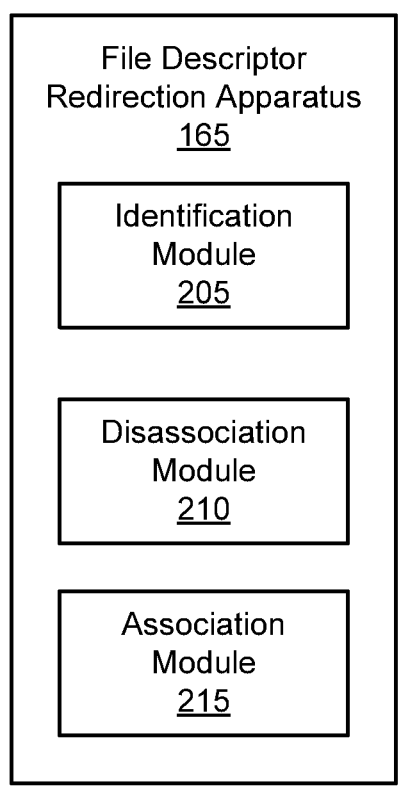
FIG. 2 is a schematic block diagram illustrating one embodiment of an apparatus for dynamically redirecting a file descriptor in accordance with the present invention.

FIG. 2 depicts one embodiment of an apparatus 165 for dynamically redirecting a file descriptor. The apparatus 165 is one embodiment of the file descriptor redirection apparatus 165 of FIG. 1B and includes one or more of an identification module 205, an disassociation module 210 and an association module 215. In one embodiment, one or more of the identification module 205, the disassociation module 210, and the association module 215 execute in kernel space 145 as depicted in FIG. 1B showing the file descriptor redirection apparatus 165 residing in kernel space. In one embodiment, one or more of the identification module 205, the disassociation module 210, and the association module 215 execute in user space 125 and may, for example comprise at least a portion of the second executing process 140.

The identification module 205, in one embodiment, identifies a first executing process 135 in which a user, application, or utility selects for file descriptor redirection. The identification module 205 may identify the first executing process 135 using a second executing process 140. For example, the user, application, or utility may pass in parameters, through the second executing process 140, specifying which process for redirection. The identification module using the second executing process 140 may also include the identification module 205 acting in response to the second executing process 140 (e.g. the second executing process 140 made a system call activating the identification module 205), the identification module 205 acting by way of the second executing process 140, the identification module 205 acting in behalf of the second executing process 140 and/or the like. In one embodiment, the identification module 205 comprises kernel code executing for the second executing process 140. The first executing process 135 includes at least one file descriptor. Furthermore, the first executing process 135 may be independent of the second executing process 140.

The identification module 205 may identify the first executing process 135 by referencing a process identifier from the second executing process 140. For example, a user, application, or utility may include a process identifier as a command line parameter when running the second process 140. The identification module 205 may then pass the process identifier to the disassociation module 210 and/or reference applicable kernel data structures associated with the first executing process 135.

In one embodiment, as mentioned above, the second executing process 140 is a user space 125 utility for managing file links. In a further embodiment, the second executing process 140 comprises an ln utility. In one embodiment, the identification module 205 acts in response to the second executing process 140 calling an ln command system call (e.g. a system call typically invoked by the ln command) but specifying a file descriptor identifier instead of a file as described below.

The disassociation module 210, in one embodiment, disassociates the file descriptor from a first data stream using the second executing process 140. The disassociation module 210 using the second executing process 140 may include the disassociation module 210 disassociating the file descriptor, in response to, by way of, and/or in behalf of the second executing process 140. In one embodiment, the first executing process 135 continues to execute during the disassociation module 210 disassociating the file descriptor from the first data stream and associating the file descriptor with the second data stream. Furthermore, in some embodiments, the disassociation module 210 disassociates the file descriptor from the first data stream without involvement of the first executing process 135. In a further embodiment, the first executing process 135 does not execute an instruction (or causing kernel code to execute an instruction) that results in disassociating the file descriptor from the first data stream while the disassociation module 210 disassociates the file descriptor.

Figure 4A:
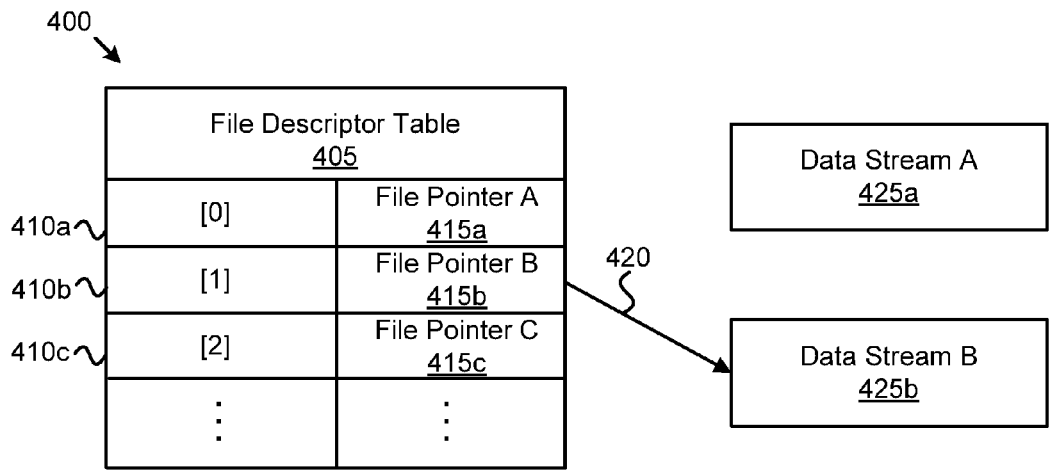
FIG. 4A is a schematic block diagram illustrating one embodiment of a file descriptor table in accordance with the present invention.
Figure 4B:
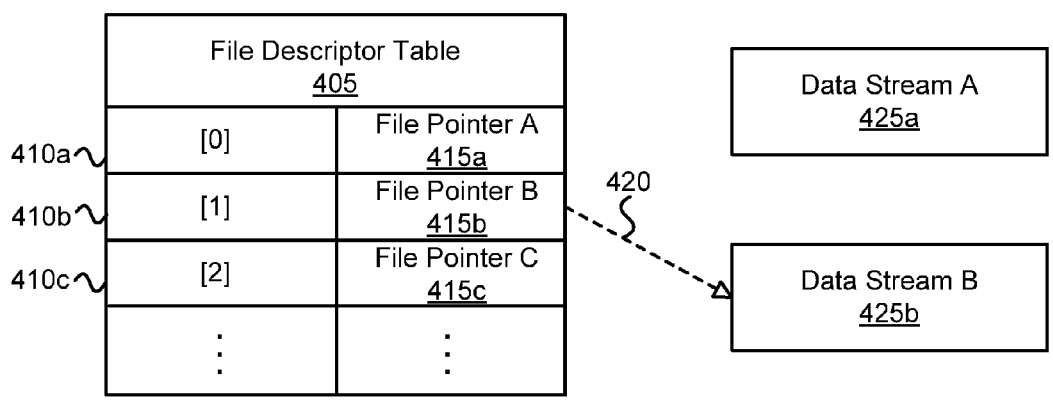
FIG. 4B is a schematic block diagram illustrating one embodiment of a file descriptor table in accordance with the present invention.

In some embodiments, the disassociation module 210 disassociates the file descriptor from the first data stream by removing a link from the file descriptor to the first data stream. FIG. 4A depicts an embodiment 400 of a file descriptor table 405 of the first process 135. The file descriptor table 405 includes a plurality of file descriptors 410a-c, with an associated file pointer for each file descriptor 415a-c. Each file pointer 415a-c creates a link 420 to a data stream 425 (e.g. a file entry in a systems file table). Referring to FIG. 4B, the disassociation module 210 may remove the link 420 (e.g. change the pointer) between a particular file pointer 415b and a particular data stream 425b.

Referring back to FIG. 2, in one embodiment, the disassociation module 210 receives a system call from the second executing process 140 to disassociate the file descriptor from the first data stream and associate the file descriptor with the second data stream. The system call, in certain embodiments, is a specialized system call configured to cause the disassociation module 210 to disassociate the file descriptor from the first data stream in response to the system call as described below.

In one embodiment, the first data stream is associated with a first output terminal and the second data stream is associated with a second output terminal. The disassociation module 210 may discontinue output of the first executing process 135 from the first output terminal in response to disassociating the file descriptor from the first data stream.

The association module 215, in one embodiment, associates the file descriptor with a second data stream using the second executing process 140. Similar to the disassociation module 210, the association module 215 using the second executing process 140 may include the association module 215 associating the file descriptor in response to, by way of, and/or in behalf of the second executing process 140. The association module 215 may associate the file descriptor with the second data stream in response to and/or subsequent to the disassociation module 210 disassociating the first executing process 135 from the first file descriptor.

In one embodiment, the association module 215 associates the file descriptor with the second data stream without involvement of the first executing process 135. In a further embodiment, the first executing process 135 does not execute an instruction that results in associating the file descriptor with the second data stream. The first executing process 135 may continue executing during the association module 215 associating the file descriptor with the second data stream.

Figure 4C:
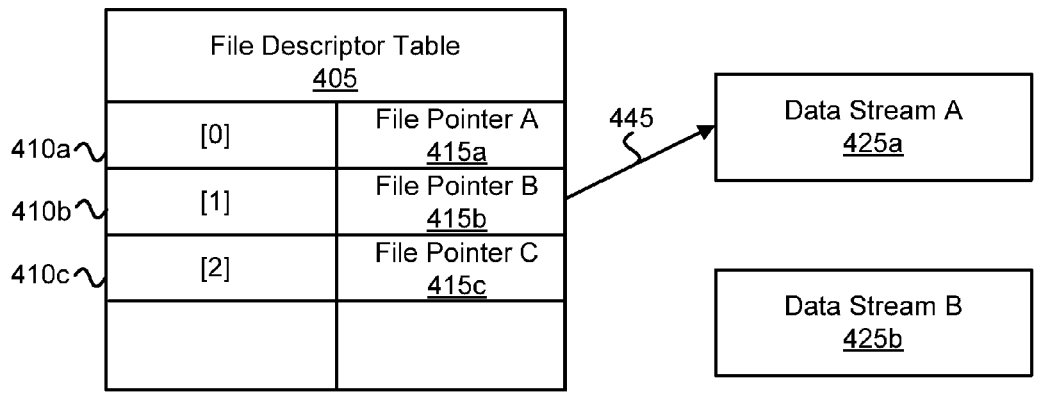
FIG. 4C is a schematic block diagram illustrating one embodiment of a file descriptor table in accordance with the present invention.

In one embodiment, associating the file descriptor with the second data stream includes adding a link from the file descriptor to the second data stream. Referring also to FIG. 4C, the association module 215 may create a link 445 from the file pointer 415b for the file descriptor to the second data stream 425a. In one embodiment, the association module 215 may associate the file descriptor with a file path. In one embodiment, the association module 215 may associate the file descriptor with a data stream referenced by a file descriptor of the second executing process 140.

In one embodiment, as stated above, the first data stream is associated with a first output terminal and the second data stream is associated with a second output terminal. The association module 215 may begin output of the first executing process 135 to the second output terminal in response to associating the file descriptor with the second data stream.

In one embodiment, the disassociation module 210 disassociates the file descriptor from the first data stream and/or the association module 215 associates the file descriptor with the second data stream using the proc file system 160. As known in the art, the proc file system 160 presents information about processes in a file-like structure, including providing references to file descriptors of particular processes. For example, if an application with process id 75, has file descriptor 1 pointing to file /tmp/foo.log, in Linux, this information may be retrieved by entering:

$ readlink /proc/75/fd/1 which would display:

/tmp/foo.log (e.g. the file descriptor /proc/75/fd/1 is linked to /tmp/foo.log).

Figure 3:
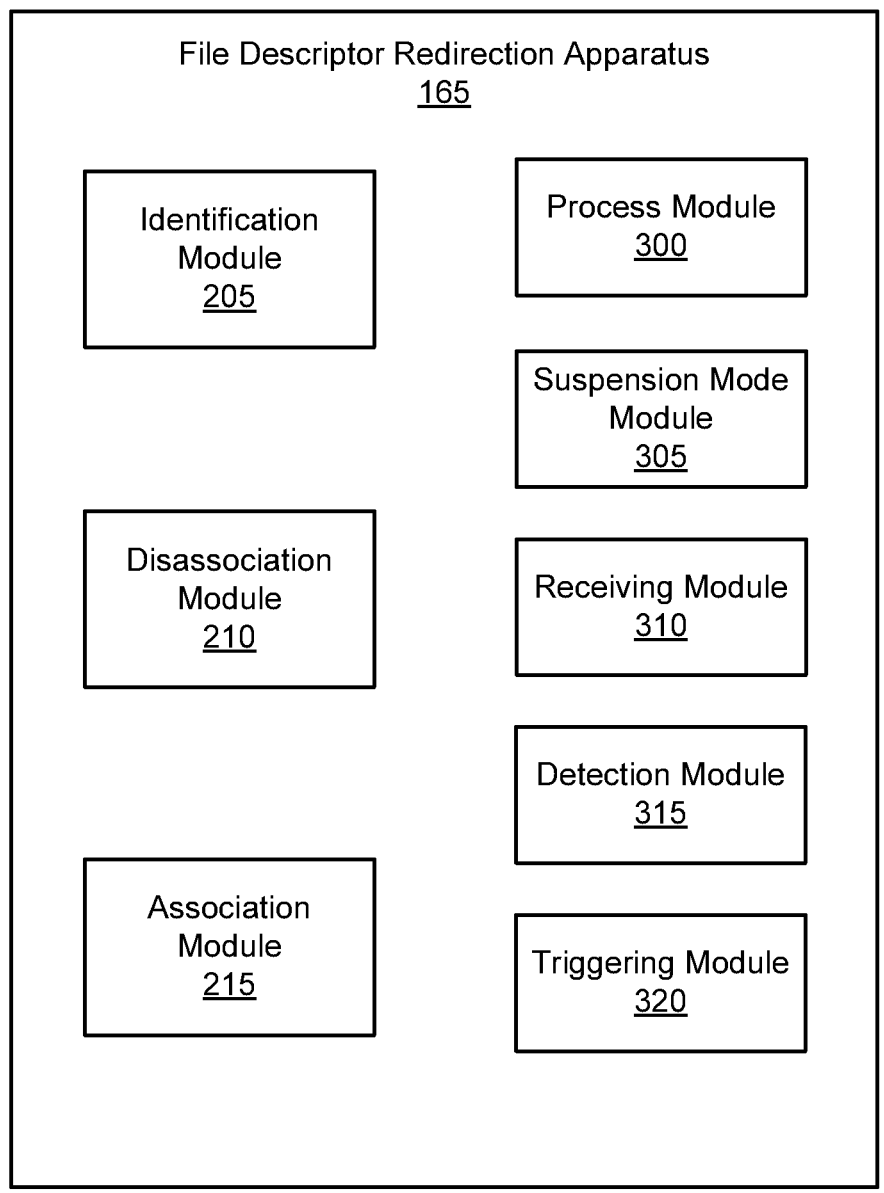
FIG. 3 is a schematic block diagram illustrating another embodiment of an apparatus for dynamically redirecting a file descriptor in accordance with the present invention.

FIG. 3 depicts another embodiment of the file descriptor redirection apparatus 165. In the depicted embodiment, the file descriptor redirection apparatus 165 includes the identification module 205, the disassociation module 210, and the association module 215, which are substantially similar to those described in relation to FIG. 2. In the embodiment, the file descriptor redirection apparatus 165 further includes one or more of a process module 300 a suspension mode module 305, a receiving module 310, a detection module 315, and a triggering module 320, which are described below. In one embodiment, one or more of the modules of the file descriptor redirection apparatus 165 execute in kernel space 145 as depicted in FIG. 1B showing the file descriptor redirection apparatus 165 residing in kernel space. In one embodiment, one or more of the modules execute in user space 125 and may, for example comprise at least a portion of the second executing process 140.

The process module 300, in one embodiment, executes a user space 125 process. The user space process may be the second executing process 140 described herein. The process module 300, one embodiment, includes, is integrated with, and or is embodied as, is a user space 125 utility—such as the ln utility—for managing file links.

In one embodiment, the process module 300 may request file descriptor redirection by referring to a file descriptor as a parameter for the ln command. Conventional kernel code executed for the ln command would return an error in response to a user or application specifying a file descriptor (e.g. putting a file descriptor indicator as a parameter for the ln command) instead of a file. However, in one embodiment, the disassociation module 210 and/or the association module 215 include at least a portion of kernel code called by the ln command and/or associated with the proc file system 160 that will determine that the process module 300 has specified a file descriptor (e.g. a user or application has initiated the ln command using a file descriptor as a parameter) and redirect the link of the file descriptor, as referenced in a file form with the proc file system 160, to the new data stream. A non-limiting example of a possible ln command (e.g. embodied by the process module 300) usable by the disassociation module 210 and association module 215 may be:

ln –sf [new target file]/proc/[process identifier]/fd/[fd to retarget]

where "new target file" is the data stream to which the file descriptor is to be redirected, "process identifier" identifies the first executing process 135 for redirection, and "fd to retarget" is the file descriptor for which redirection is desired. For example, a user may wish to redirect a file descriptor for a particular file. The user may use the familiar interface of the conventional ln command, instead substituting the file descriptor that the user wants to redirect from as a parameter instead of a file.

In one embodiment, instead of (or in addition to) using the conventional ln utility to allow a user or application to initiate file descriptor redirection, initiates a specialized system call (instead of the system call typically associated with the ln command), through the second executing process 140, to disassociate the file descriptor from the first data stream and associate the file descriptor with the second data stream. The system call may include parameters specifying a process identifier, a file descriptor identifier, and a data stream identifier or a second file descriptor identifier (the association module 215 may associate the process with the data stream of the second file descriptor identifier. A non-limiting example of C code for the system call is:

[new fd]=open("[new target file]", O_RDWR); fstat([new fd], . . . );

retarget_fd([process identifier], [old fd], [new fd]);

where "new fd" refers to a identifier for a second file descriptor representing the second data stream, which, when used right before the retarget operation with the "open( )" function and the "fstat( )" function, may open and verify the new file while minimizing race conditions. The "new target file" designates the second data stream, "retarget_fd" is the system call, and "old fd" is the file descriptor with the link to the first data stream. The process module 300 may initiate the specialized system call to trigger the disassociation module 210 and the association module 215 as described above.

In certain embodiments or with certain processes, the first executing process 135 may be put into a suspension mode prior to file descriptor redirection. For example, the first executing process may be put into a suspension mode to avoid certain race conditions. The suspension mode module 305, in one embodiment, puts the first executing process 135 into a suspension mode prior to the disassociation module 210 disassociating the file descriptor from the first data stream. The suspension mode module 305 may put the first executing process 135 into a suspension mode using, in behalf of, and/or in response to, the second executing process 140. The suspension mode module 305 may put the first executing process 135 into the suspension mode in response to a parameter passed from the second executing process 140, a default setting, or the like. For example, the user may wish to first suspend the first executing process 135 prior to redirection and notify the suspension mode module 305 with a parameter input into the process module 300. The suspension mode module 305, in one embodiment, further takes the first executing process 135 out of the suspension mode using the second executing process 140 subsequent to the association module 215 associating the file descriptor with the second data stream. The suspension mode may be a quiesced state in which the first executing process 135 maintains its state data, its run-time variables and the like, but does not execute any further operations while in the suspension mode. Conversely, a process that is shut down would lose state data and run-time variables, forcing the user to possibly have to re-run the process for days or weeks to obtain the same state. Thus, an embodiment where the first executing process is merely put in a suspension mode may be advantageous over the prior art method of shutting down the process.

The receiving module 310, in one embodiment, receives and/or references parameters that specify a process to redirect, a particular file descriptor to redirect, and/or a data stream to redirect the particular file descriptor to. These parameters may include a process identifier, a file descriptor identifier, and a data stream identifier. In one embodiment, these identifiers may include parameters and arguments input by a user or application into the process module 300 and/or the second process 140. The process identifier identifies the first executing process 135 (e.g. a string identifier in file notation according to the proc file system 160). The file descriptor identifier identifies the file descriptor (e.g. also a string identifier in file notation according to the proc file system 160). The data stream identifier identifies the second data stream (e.g. a file path designating the new data stream to redirect the file descriptor to). The receiving module 310 may receive and/or reference the identifiers from parameters of the second executing process 140 and/or variables in a system call. The receiving module 310 may also receive any other parameters such as a suspension mode parameter specifying whether to put the first executing process 135 into the suspension mode.

The detection module 315 allows the file descriptor redirection apparatus 165 to perform file descriptor redirection in response to receiving a command with an existing utility such as the ln utility instead of the operating system returning an error when the user or application uses a file descriptor as a parameter in the utility. Specifically, the detection module 315 detects the utility (e.g. the second executing process 140 embodied by the process module 300) specifying a file descriptor instead of a file in its parameters. Instead of the operating system returning an error as in conventional operating systems, the detection module 315 detects the file descriptor parameter and signals the disassociation module 210. In one embodiment, the disassociation module 210 disassociating the file descriptor from the first data stream and the association module 215 associating the file descriptor with a second data stream occur in response to the detection module 315 detecting the second executing process 140 specify the file descriptor instead of the file. As stated above, the use may use a pre-existing utility, the ln command, specifying a file descriptor instead of a file.

The triggering module 320 automatically triggers file descriptor redirection. Specifically, in one embodiment, the triggering module 320 triggers disassociating the file descriptor from the first data stream and associating the file descriptor with a second data stream in response to predetermined criteria. The predetermined criteria may include storage space reaching a threshold and/or an error condition. For example, a user may wish to have error messages directed to a first file unless the amount of error messages reaches a predetermined threshold, in which case the user may wish to redirect the error messages to a second file. The user may also wish to redirect output from the first executing process 135 from a disk nearing its capacity to another disk. In one embodiment, the triggering module 320 is a user space 125 utility that initiates file descriptor redirection. In a further embodiment, the triggering module 320 comprises at least a portion of the second process 140 and/or initiates the process module 300 in response to detecting the predetermined criteria.

Figure 5:
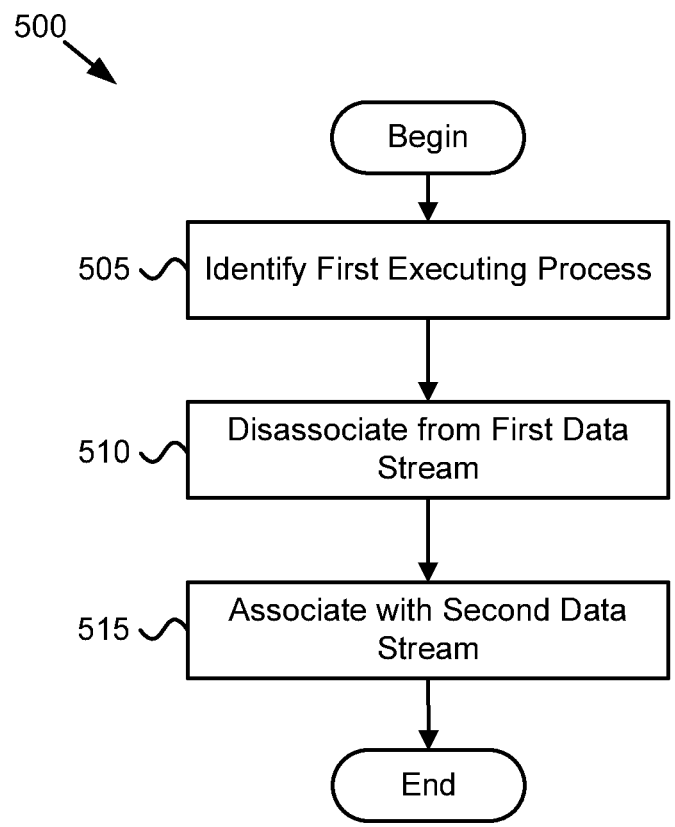
FIG. 5 is a schematic flow chart diagram illustrating one embodiment of a method for dynamically redirecting a file descriptor in accordance with the present invention.

FIG. 5 depicts one embodiment of a method 500 for dynamically redirecting a file descriptor. The method 500 begins and the identification module 205 identifies 505 a first executing process 135 using a second executing process 140. The first executing process 135 includes a first file descriptor and the first executing process 135 is typically independent of the second executing process 140. Next, the disassociation module 210 disassociates 510 the file descriptor from a first data stream using the second executing process 140 without involvement of the first executing process 135. Then, the association module 215 associates 515 the file descriptor with a second data stream using the second executing process 140 without involvement of the first executing process 135. In one embodiment, disassociating the file descriptor from the first data stream and associating the file descriptor with the second data stream includes changing a link from the file descriptor to the first data stream to the file descriptor and the second data stream. Then, the method 500 ends.

Figure 6:
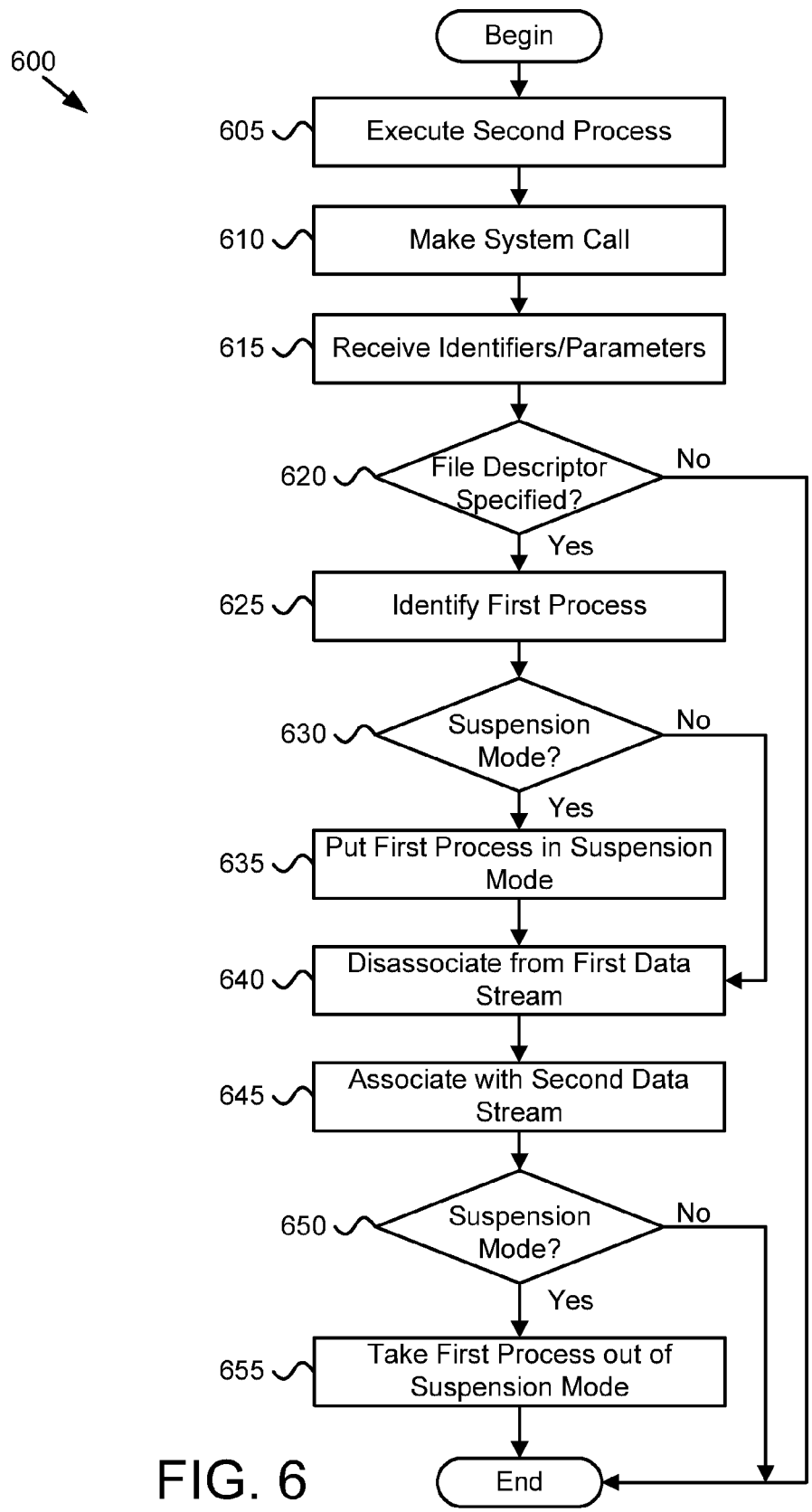
FIG. 6 is a schematic flow chart diagram illustrating another embodiment of a method for dynamically redirecting a file descriptor in accordance with the present invention.

FIG. 6 depicts one embodiment of another method 600 for dynamically redirecting a file descriptor. The method 600 begins and the process module 300 executes 605 a second process 140 initiated by a user or application. For example, the user may wish to redirect output of a particular process because the user's disk is nearing capacity. The second process 140 may include parameters specifying an identity of the first process 135, the desired file descriptor, and the data stream to which the file descriptor will be redirected. In one embodiment, the second process 140 is a pre-existing utility such as the ln command. The process module 300 then makes 610 a system call to the operating system kernel 150. The system call may be a standard system call typically associated with the ln command. The receiving module 310 receives 615 the system call and/or notification or instructions from the system call and a process identifier, a file descriptor identifier, and a data stream identifier. If the detection module 315 determines 620 that the second process 140 is specifying a particular file descriptor instead of a file in its parameters, instead of returning an error, the identification module 205 identifies 625 a first executing process 135 specified from the process identifier (e.g. passed in by the user or application as a parameter). The suspension mode module 305 determines 630 whether to put the first executing process 135 into a suspension mode (e.g. the second process 140 has specified a suspension mode through a parameter or the suspension mode is a default setting for each process or for certain processes). For example, the suspension mode module 305 may be preconfigured to place certain processes, such as vital system processes, into a suspension mode before redirection. If the suspension mode module 305 determines 630 that the first executing process 135 is to be put into the suspension mode, the suspension mode module 305 puts 630 the first executing process 135 into the suspension mode and the method 600 moves to step 640. Alternatively, the method 600 moves directly to step 640.

Next, the disassociation module 210 disassociates 640 the file descriptor from a first data stream. Then, the association module 215 associates 645 the file descriptor with a second data stream. If the first process 135 is not in the suspension mode, the method 600 ends. Alternatively, the suspension mode module 305 takes 655 the first process 135 out of suspension mode. Then, the method 600 ends. In some embodiments, the first data stream is associated with a first output terminal and the second data stream is associated with a second output terminal. In this embodiment, disassociating the file descriptor from the first data stream and associating the file descriptor with the second data stream switches output of the first executing process 135 from the first output terminal to the second output terminal.

Figure 7:
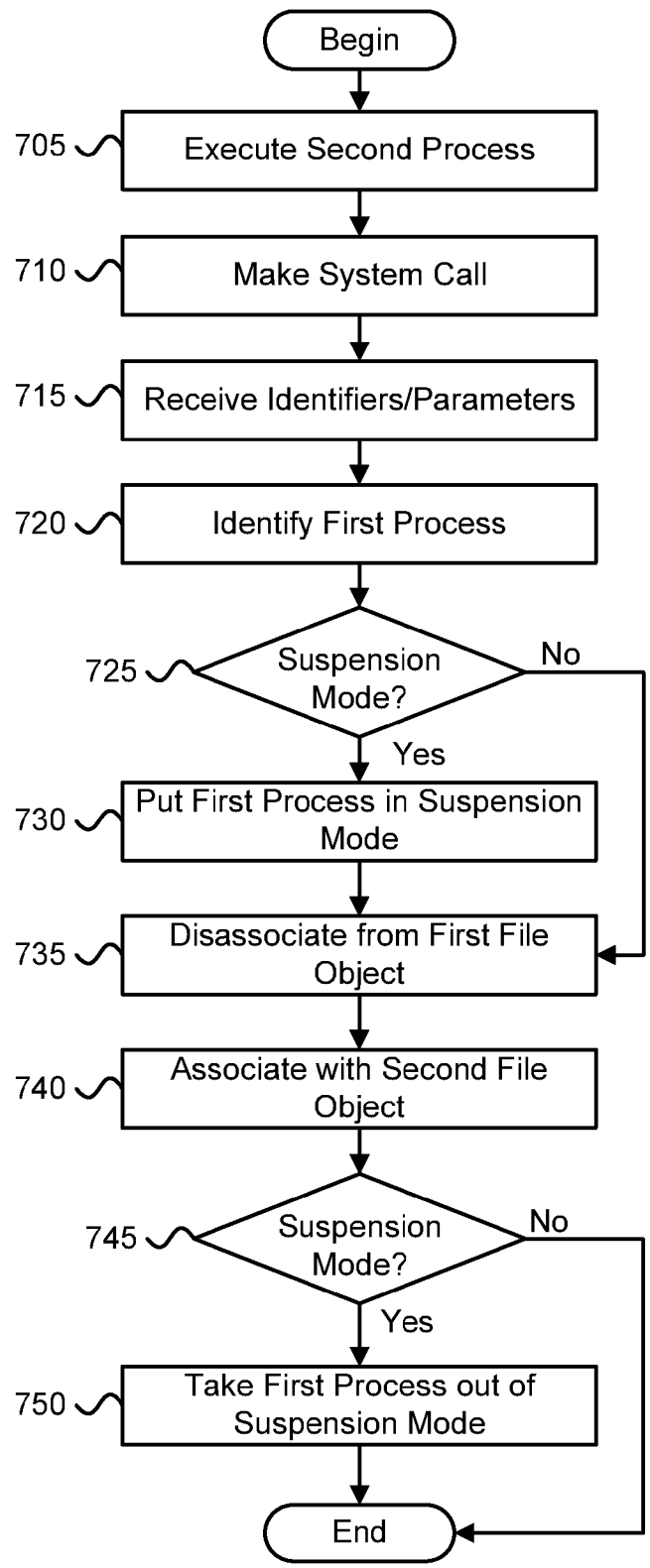
FIG. 7 is a schematic flow chart diagram illustrating another embodiment of a method for dynamically redirecting a file descriptor in accordance with the present invention.

FIG. 7 depicts one embodiment of another method 700 for dynamically redirecting a file descriptor. The method 700 begins and the process module 300 executes 705 a second process 140 initiated by a user or application. For example, the user may wish to redirect output of a particular process because the wishes to switch terminals. In one embodiment, the process module 300 is configured to make a specialized system call to redirect a file descriptor. The process module 300 then makes 710 the system call to the operating system kernel. The receiving module 310 receives 715 the system call and/or notification of the system call and a process identifier, a file descriptor identifier, and a data stream identifier (e.g. parameters input from the user or application into the process module 300). The suspension mode module 305 determines whether 725 to put the first executing process 135 into a suspension mode (e.g. the second process 140 has specified a suspension mode through a parameter or the suspension mode is a default setting). If the suspension mode module 305 determines 725 that the first executing process 135 is to be put into the suspension mode, the suspension mode module 305 puts 730 the first executing process 135 into the suspension mode and the method 700 moves to step 735. Alternatively, the method 700 moves directly to step 735.

Next, the disassociation module 210 disassociates 735 the file descriptor from a first data stream. Then, the association module 215 associates 740 the file descriptor with a second data stream. If the first process 135 is not in the suspension mode, the method 700 ends. Alternatively, the suspension mode module 305 takes 750 the first process 135 out of suspension mode. Then, the method 700 ends.

Figure 8A:
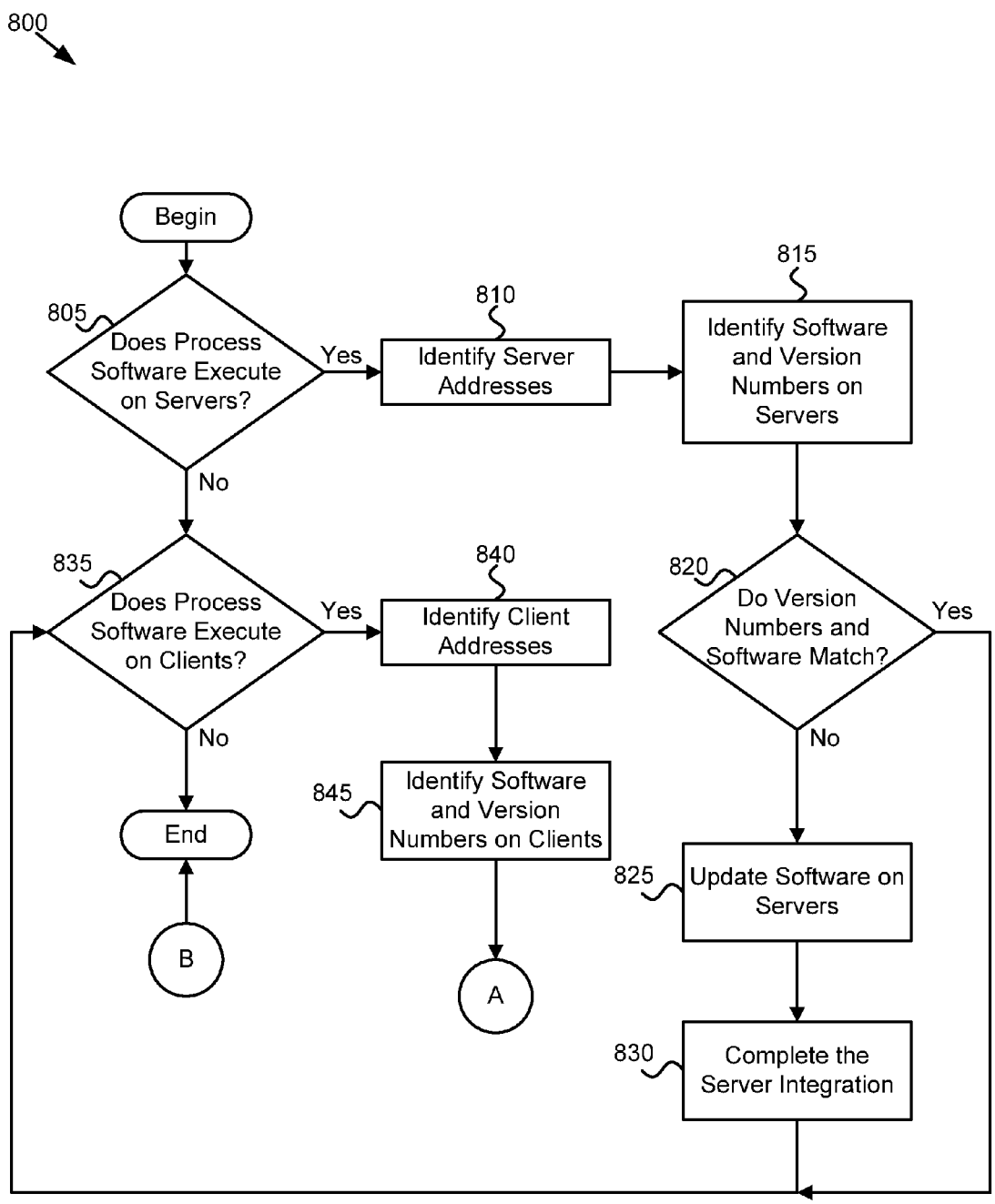
FIG. 8A is a schematic flow chart diagram illustrating one embodiment of a method for integrating a file descriptor redirection apparatus with an operating system in accordance with the present invention.
Figure 8B:
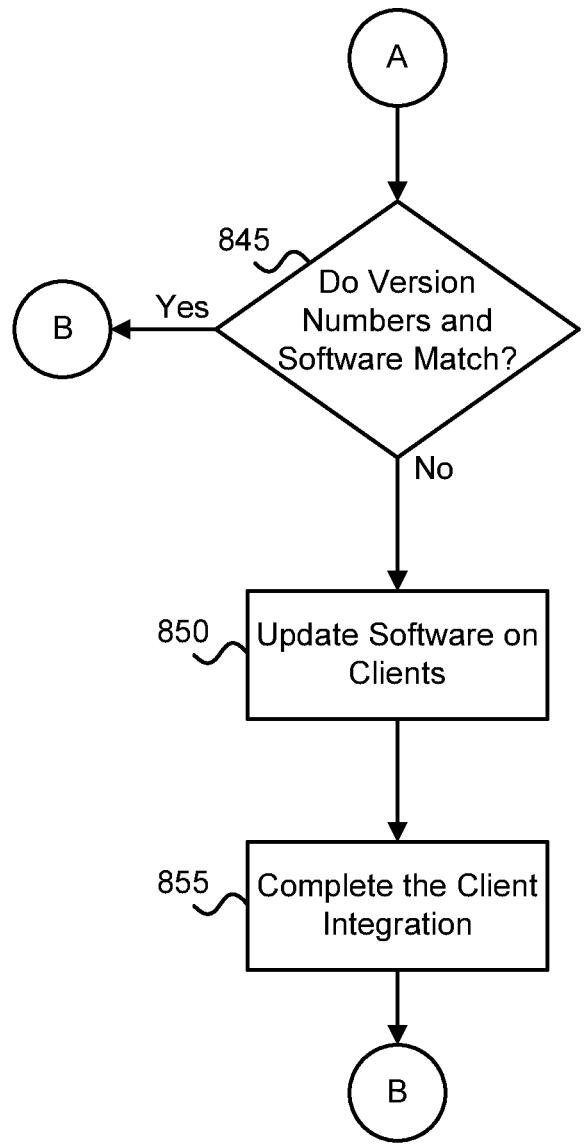
FIG. 8B is a continuation of FIG. 8A illustrating one embodiment of the method for integrating the file descriptor redirection apparatus with the operating system in accordance with the present invention.

FIGS. 8A and 8B depict one embodiment of a method 800 for integrating a file descriptor redirection apparatus 165 with an operating system. The file descriptor redirection apparatus 165 may comprise one or more process software programs. In one embodiment, the process software which includes the file descriptor redirection apparatus 165 is integrated into a client, server and network environment by providing for the process software to coexist with applications, operating systems and network operating systems software and then installing the process software on the clients and servers in the environment where the process software will function.

A service provider, a network administrator, a user, or the like, may identify any software on the clients and servers including the network operating system where the process software will be deployed that are required by the process software or that work in conjunction with the process software. This may include the network operating system that is software that enhances a basic operating system by adding networking features.

Next, the software applications and version numbers may be identified and compared to the list of software applications and version numbers that have been tested to work with the process software. Those software applications that are missing or that do not match the correct version may be upgraded with the correct version numbers. Program instructions that pass parameters from the process software to the software applications may be checked to ensure the parameter lists match the parameter lists required by the process software. Conversely, parameters passed by the software applications to the process software may be checked to ensure the parameters match the parameters required by the process software. The client and server operating systems including the network operating systems will be identified and compared to the list of operating systems, version numbers and network software that have been tested to work with the process software. Those operating systems, version numbers and network software that do not match the list of tested operating systems and version numbers may be upgraded on the clients and servers to the required level. After ensuring that the software, where the process software is to be deployed, is at the correct version level that has been tested to work with the process software, the integration is completed by installing the process software on the clients and servers.

The method 800 begins with determining 805 if there are any of the process software programs that will execute on a server or servers. If this is not the case, then integration proceeds to 835. If this is the case, then the server addresses are identified 810. The servers are checked 815 to see if they contain software that includes the operating system ("OS"), applications, and network operating systems ("NOS"), together with their version numbers that have been tested with the process software. The servers may also be checked 815 to determine if there is any missing software that is required by the process software.

A determination 820 is made if the version numbers match the version numbers of OS, applications and NOS that have been tested with the process software. If all of the versions match and there is no missing required software the integration continues in 835. If one or more of the version numbers do not match, then the unmatched versions are updated 825 on the server or servers with the correct versions. Additionally if there is missing required software, then it is updated 825 on the server or servers. The server integration is completed 830 by installing the process software. Step 835 which follows 805, 820, or 830 determines 835 if there are any programs of the process software that will execute on the clients. If no process software programs execute on the clients, the method 800 ends. If this not the case, then the client addresses are identified 840.

The clients are checked 845 to see if they contain software that includes the operating system ("OS"), applications, and network operating systems ("NOS"), together with their version numbers that have been tested with the process software. The clients may also be checked 845 to determine if there is any missing software that is required by the process software.

Referring to FIG. 8B, a determination is made 845 whether the version numbers match the version numbers of OS, applications and NOS that have been tested with the process software. If all of the versions match and there is no missing required software, then, referring back to FIG. 8A, the method 800 ends.

Alternatively, if one or more of the version numbers do not match, then the unmatched versions are updated 850 on the clients with the correct versions. In addition, if there is missing required software then it is updated 850 on the clients. The client integration is completed 855 by installing the process software on the clients, then, referring back to FIG. 8A, the method 800 ends.

The embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:
    identifying a first executing process in response to an activation event associated with a second executing process, the first executing process comprising a file descriptor, the first executing process independent of the second executing process;
    disassociating the file descriptor from a first data stream in response to the second executing process without involvement of the first executing process;
    determining whether to suspend the first executing process or leave the first executing process executing, wherein determining whether to suspend the first executing process occurs prior to disassociating the file descriptor and wherein determining whether to suspend the first executing process is based on one or more of a parameter and a setting from the second executing process;
    associating the file descriptor with a second data stream in response to the second executing process without involvement of the first executing process subsequent to disassociating the file descriptor from the first data stream; and
    triggering disassociating the file descriptor from the first data stream and associating the file descriptor with the second data stream in response to predetermined criteria.

2. The method of claim 1, wherein the file descriptor comprises an index to an entry in a file descriptor table for the first executing process.

3. The method of claim 2, wherein the file descriptor specifies one of a source for the first executing process to receive input and a destination for the first executing process to direct output.

4. The method of claim 1, wherein disassociating the file descriptor from the first data stream further comprises disassociating the file descriptor from the first data stream using the second executing process without the first executing process executing an instruction that results in disassociating the file descriptor from the first data stream and wherein associating the file descriptor with the second data stream further comprises associating the file descriptor with the second data stream using the second executing process without the first executing process executing an instruction that results in associating the file descriptor with the second data stream.

5. The method of claim 1, wherein the first executing process continues to execute during disassociating the file descriptor from the first data stream and associating the file descriptor with the second data stream.

6. The method of claim 1, further comprising putting the first executing process into a suspension mode using the second executing process prior to disassociating the file descriptor from the first data stream.

7. The method of claim 6, further comprising taking the first executing process out of the suspension mode using the second executing process subsequent to associating the file descriptor with the second data stream.

8. The method of claim 1, wherein disassociating the file descriptor from the first data stream and associating the file descriptor with the second data stream further comprises changing a link from the file descriptor to the first data stream to the file descriptor and the second data stream, the file descriptor referencing a file descriptor table for the first executing process.

9. The method of claim 1, further comprising receiving a process identifier, a file descriptor identifier, and a data stream identifier, the process identifier identifying the first executing process, the file descriptor identifier identifying the file descriptor, and the data stream identifier identifying the second data stream.

10. The method of claim 1, wherein the second executing process comprises a user space utility for managing file links, the method further comprising detecting the second executing process specifying a particular file descriptor instead of a file, wherein disassociating the file descriptor from the first data stream and associating the file descriptor with a second data stream occur in response to detecting the second executing process specify the particular file descriptor instead of the file.

11. The method of claim 10, wherein the second executing process comprises an ln utility.

12. The method of claim 1, wherein the second executing process initiates a system call to disassociate the file descriptor from the first data stream and associate the file descriptor with the second data stream, the method further comprising receiving the system call, wherein disassociating the file descriptor from the first data stream and associating the file descriptor with the second data stream occur in response to receiving the system call.

13. The method of claim 1, wherein the first data stream is associated with a first output terminal and the second data stream is associated with a second output terminal, the method further comprising switching output of the first executing process from the first output terminal to the second output terminal in response to disassociating the file descriptor from the first data stream and associating the file descriptor with a second data stream.

14. The method of claim 1, wherein the predetermined criteria comprises one of
    storage space reaching a threshold; and
    an error condition.

15. A computer program product comprising a non-transitory computer readable storage medium having computer readable program code embodied therewith, the computer readable program code for:
    identifying a first executing process in response to an activation event associated with a second executing process, the first executing process comprising a file descriptor, the first executing process independent of the second executing process;
    disassociating the file descriptor from a first data stream in response to the second executing process without involvement of the first executing process;
    determining whether to suspend the first executing process or leave the first executing process executing, wherein determining whether to suspend the first executing process occurs prior to disassociating the file descriptor and wherein determining whether to suspend the first executing process is based on one or more of a parameter and a setting from the second executing process;
    associating the file descriptor with a second data stream in response to the second executing process without involvement of the first executing process subsequent to disassociating the file descriptor from the first data stream; and
    triggering disassociating the file descriptor from the first data stream and associating the file descriptor with the second data stream in response to predetermined criteria.

16. The computer program product of claim 15, wherein the file descriptor comprises an index to an entry in a file descriptor table for the first executing process, wherein the file descriptor specifies one of a source for the first executing process to receive input and a destination for the first executing process to direct output.

17. A method comprising:
- integrating a file descriptor redirection apparatus with an operating system, the file descriptor redirection apparatus capable of,
- identifying a first executing process in response to an activation event associated with a second executing process, the first executing process comprising a file descriptor, the first executing process independent of the second executing process;
- disassociating the file descriptor from a first data stream in response to the second executing process without involvement of the first executing process;
- determining whether to suspend the first executing process or leave the first executing process executing, wherein determining whether to suspend the first executing process occurs prior to disassociating the file descriptor and wherein determining whether to suspend the first executing process is based on one or more of a parameter and a setting from the second executing process;
- associating the file descriptor with a second data stream in response to the second executing process without involvement of the first executing process subsequent to disassociating the file descriptor from the first data stream; and
- triggering disassociating the file descriptor from the first data stream and associating the file descriptor with the second data stream in response to predetermined criteria.

* * * * *